(12) United States Patent
Diachina et al.

(10) Patent No.: US 8,995,336 B2
(45) Date of Patent: Mar. 31, 2015

(54) MTC SERVICE ACTIVATION

(75) Inventors: John Diachina, Garner, NC (US);
Anders Molander, Linköping (SE);
Andreas Bergström, Vikingstad (SE);
Claes-Göran Persson, Mjölby (SE);
Paul Schliwa-Bertling, Ljungsbro (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 526 days.

(21) Appl. No.: 13/090,970

(22) Filed: Apr. 20, 2011

(65) Prior Publication Data

US 2011/0280184 A1 Nov. 17, 2011

Related U.S. Application Data

(60) Provisional application No. 61/333,337, filed on May 11, 2010.

(51) Int. Cl.
*H04W 4/00* (2009.01)
*H04W 76/02* (2009.01)
(52) U.S. Cl.
CPC .............. *H04W 76/022* (2013.01); *H04W 4/00* (2013.01)
USPC .......................................................... 370/328
(58) Field of Classification Search
CPC ................................ H04W 4/00; H04W 76/022
USPC ........................ 370/310, 328; 455/403, 466
See application file for complete search history.

(56) References Cited

U.S. PATENT DOCUMENTS

| | | | |
|---|---|---|---|
| 7,774,008 B2 * | 8/2010 | Benaouda et al. | 455/466 |
| 2011/0264740 A1 * | 10/2011 | Diachina et al. | 709/204 |
| 2011/0274042 A1 * | 11/2011 | Diachina et al. | 370/328 |
| 2012/0004003 A1 * | 1/2012 | Shaheen et al. | 455/509 |
| 2012/0087274 A1 * | 4/2012 | Meriau | 370/253 |
| 2012/0110145 A1 * | 5/2012 | Pinheiro et al. | 709/220 |
| 2012/0224516 A1 * | 9/2012 | Stojanovski et al. | 370/310 |
| 2012/0252517 A1 * | 10/2012 | Karampatsis et al. | 455/515 |
| 2012/0264451 A1 * | 10/2012 | Kim et al. | 455/456.1 |
| 2012/0282956 A1 * | 11/2012 | Kim et al. | 455/466 |
| 2012/0302229 A1 * | 11/2012 | Ronneke | 455/422.1 |
| 2012/0315874 A1 * | 12/2012 | Li et al. | 455/411 |
| 2013/0051228 A1 * | 2/2013 | Kim et al. | 370/230 |
| 2013/0188515 A1 * | 7/2013 | Pinheiro et al. | 370/254 |
| 2013/0265953 A1 * | 10/2013 | Salkintzis et al. | 370/329 |
| 2013/0332627 A1 * | 12/2013 | Skog et al. | 709/244 |

FOREIGN PATENT DOCUMENTS

EP 1 662 728 A1 5/2006
WO WO 2009/112793 A1 9/2009

* cited by examiner

*Primary Examiner* — Chi H Pham
*Assistant Examiner* — Robert Lopata

(57) ABSTRACT

An MTC device activates an MTC service by first performing an MTC device attachment procedure to attach to a mobile communication network. After the MTC device is attached to the mobile communication network, the MTC device activates a packet data protocol context for the MTC device with the mobile communication network. After the packet data protocol context is activated, the MTC device activates an MTC service with an MTC server.

9 Claims, 5 Drawing Sheets

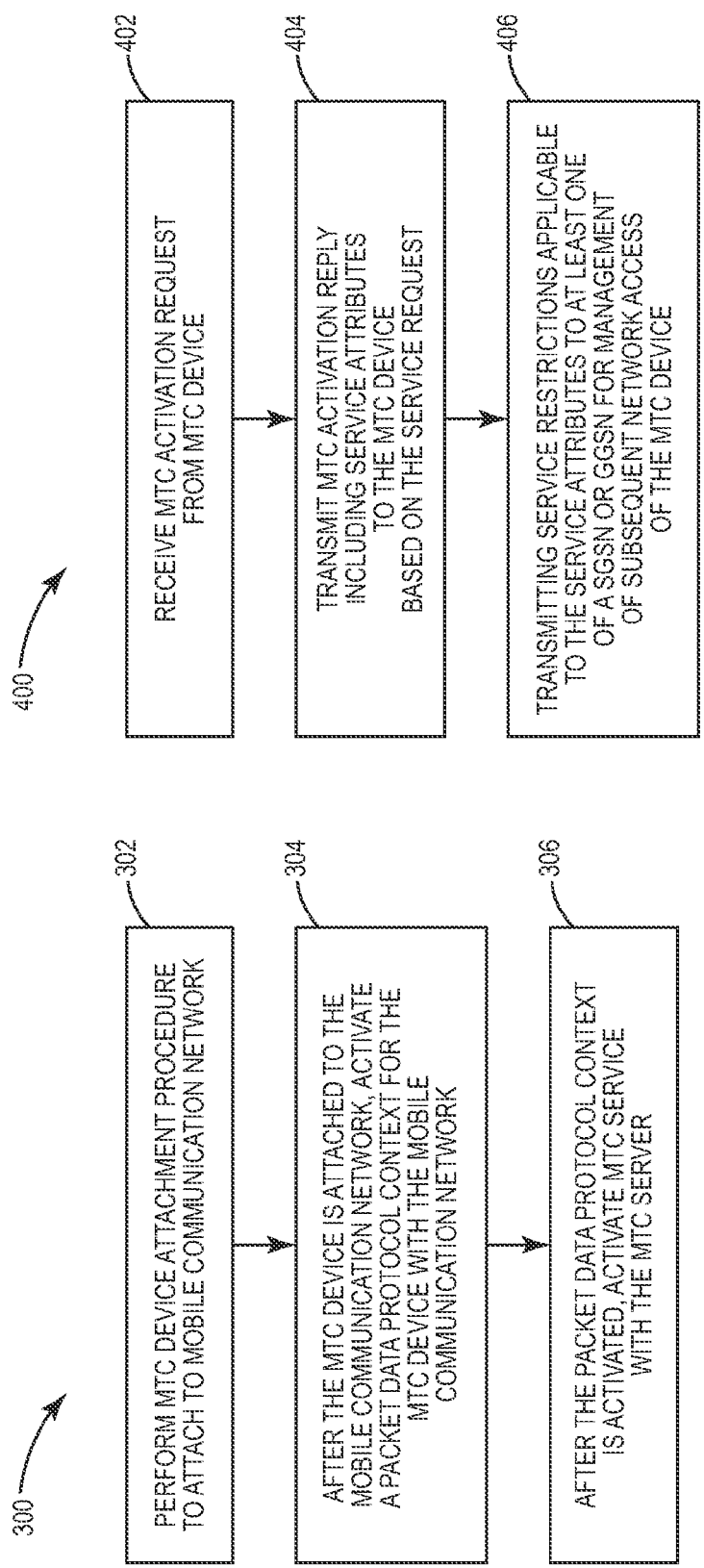

MTC SERVICE ACTIVATION

RELATED APPLICATION

This application claims the benefit of U.S. Provisional Patent Application 61/333,337 filed May 11, 2010, which is incorporated herein by reference.

BACKGROUND

The present invention relates generally to machine type communication (MTC) devices, and, more particularly, to activating an MTC service in a mobile communication network.

The anticipated introduction of a large volume of machine-type communication (MTC) devices in the near future will greatly increase the demand on the resources of mobile communication networks. MTC devices are devices, such as meters or sensors, that collect and send data to an MTC server or other MTC devices over a communication network. It is expected that MTC devices will soon far outnumber non-MTC devices, such as user terminals for voice and data communications by human users.

Mobile communication networks have been traditionally designed for voice and data communication between human users. Increasingly though, MTC devices are conducting machine-to-machine communications over mobile communication networks.

SUMMARY

The present invention provides a method and apparatus for activating an MTC service with respect to an MTC device and an MTC server.

According to one non-limiting embodiment, an MTC device performs an MTC device attachment procedure to attach to a mobile communication network. After the MTC device is attached to the mobile communication network, the MTC device activates a packet data protocol (PDP) context for itself with the mobile communication network. After the PDP context is activated, the MTC device activates an MTC service with an MTC server.

According to one non-limiting embodiment, an MTC device includes a transceiver for communicating with a base station in a mobile communication network, and includes a processing circuit. The processing circuit is configured to perform an MTC device attachment procedure to attach to a mobile communication network. The processing circuit is also configured to activate a PDP context for the MTC device with the mobile communication network, with the activation happening after the MTC device is attached to the mobile communication network. The processing circuit is further configured to activate an MTC service with an MTC server after the PDP context is activated.

According to one non-limiting embodiment, a method implemented by an MTC server of managing network access of an MTC device comprises receiving an MTC activation request from an MTC device, and transmitting an MTC activation reply including service attributes to the MTC device based on the activation request. The MTC server then transmits service restrictions applicable to the service attributes to at least one of a Serving GPRS Support Node (SGSN) or Gateway GPRS Support Node (GGSN) for management of subsequent network access of the MTC device.

BRIEF DESCRIPTION OF THE DRAWINGS

FIG. 4 illustrates an exemplary method implemented by an MTC device of activating an MTC service.

FIG. 5 illustrates an exemplary method implemented by an MTC server of managing network access of an MTC device.

DETAILED DESCRIPTION

Figure 1:
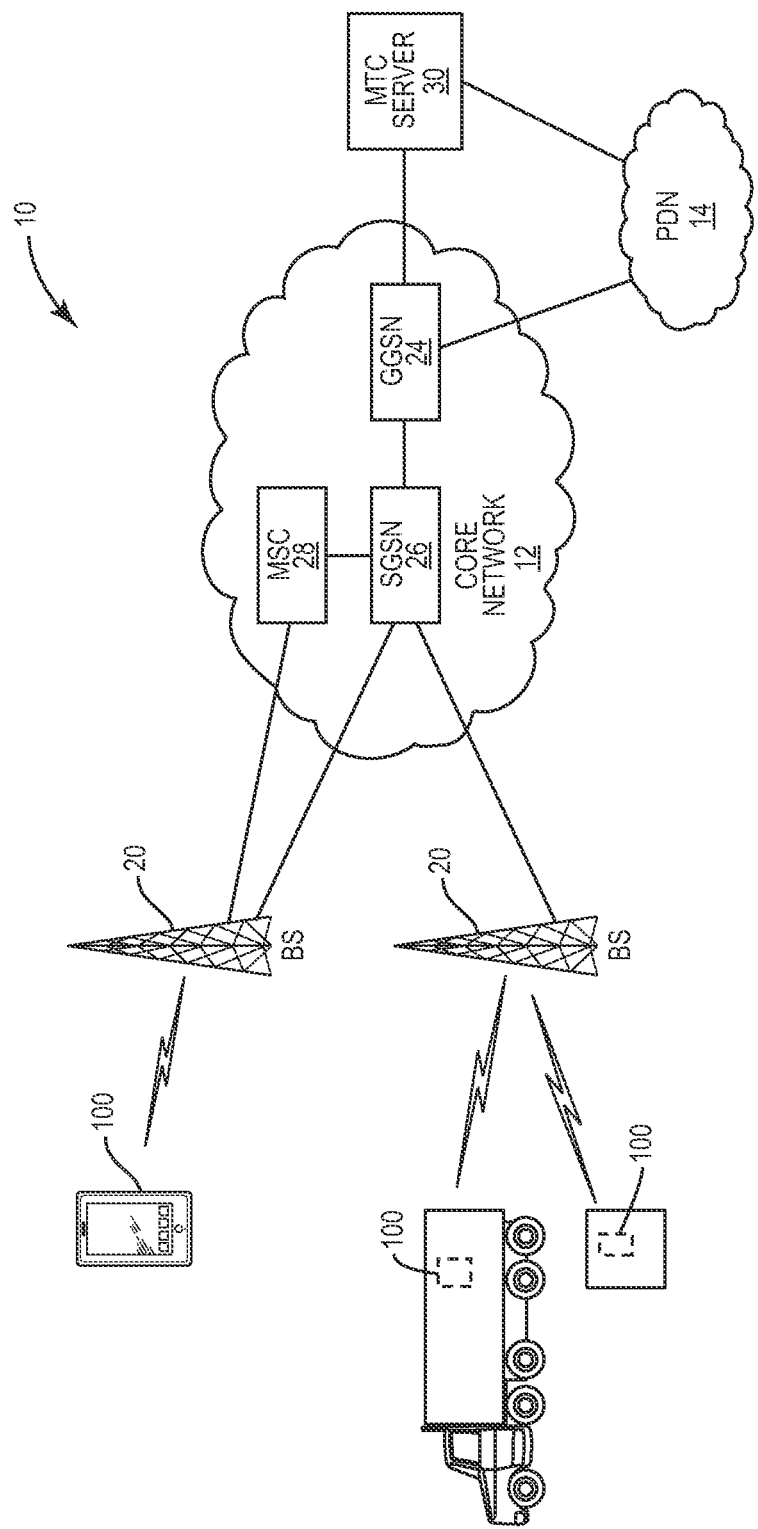
FIG. 1 illustrates an exemplary wireless communication network for communication by MTC devices.

Referring now to the drawings, FIG. 1 illustrates an exemplary mobile communication network 10 including a core network 12, a plurality of base stations 20, and a plurality of MTC devices 100. The communication network 10 may operate according to any communication standard that employs a contention-based random access channel (RACH). For illustrative purposes, an exemplary embodiment of the present invention will be described in the context of a network operating according to the GSM/EDGE (Global System for Mobile Communication (GSM) Enhanced Data Rates for GSM Evolution (EDGE)) standard. Those skilled in the art will appreciate, however, that the present invention is more generally applicable to other wireless communication systems, including Wideband Code Division Multiple Access (WCDMA), Long-Term Evolution (LTE), and Worldwide Interoperability for Microwave Access (WiMAX) systems.

The base stations 20 provide wireless network access to MTC devices 100 operating within the coverage area of the network 10. The core network 12 comprises a Mobile Switching Center (MSC) 28, a Serving GPRS Support Node (SGSN) 26, and a Gateway GPRS Support Node (GGSN) 24. MSC 28 controls each of the base stations 20, and is operable to route voice calls to and from wireless terminals having voice communication features (not shown). The SGSN 26 is responsible for delivery of data packets to and from the MTC devices 100 for packet-switched services. The GGSN 24 provides a connection to an external packet data network 14, such as the Internet. MTC device 100 may communicate with one or more servers, such as MTC server 30, connected to the mobile communication network 10 or packet data network 14.

Machine Type Communications (MTC) has been defined as a specific type of wireless communication network traffic. See, e.g., 3GPP Technical Report 23.888, "System Improvements for Machine-Type Communications," the disclosure of which is incorporated herein by reference in its entirety. One example of an MTC device 100 is a gas or power meter with a wireless transceiver 102 (see FIG. 6) for reporting at predetermined time periods usage of gas or electrical power to the MTC server 30. Non-MTC devices are devices, such as a cell phone, smart phone, laptop computer, etc., used for voice and data communications by human users.

Each MTC device 100 is operable to activate an MTC service with the MTC server 30. In one example activation of the MTC service corresponds to a registration of the MTC device 100 with the MTC server 30. During MTC service activation, the MTC device 100 may be assigned one or more service attributes by the MTC server 30. The service attributes may define operating parameters for the MTC device 100, for example. In one example, the MTC server 30 may store subscription information (e.g. access restrictions) for the MTC devices 100, and may also store MTC data uploaded by the MTC devices 100. The MTC server 30 may transmit service restrictions applicable to the service attributes to a network node, such as the SGSN 26 or GGSN 24, when the MTC device 100 activates the MTC service. The network node may then use the service restrictions to control network access of the MTC device 100. For example, the network node may use the service restrictions as described in co-pending U.S. application Ser. No. 13/051,345 or 13/051,361, for example.

Figure 2:
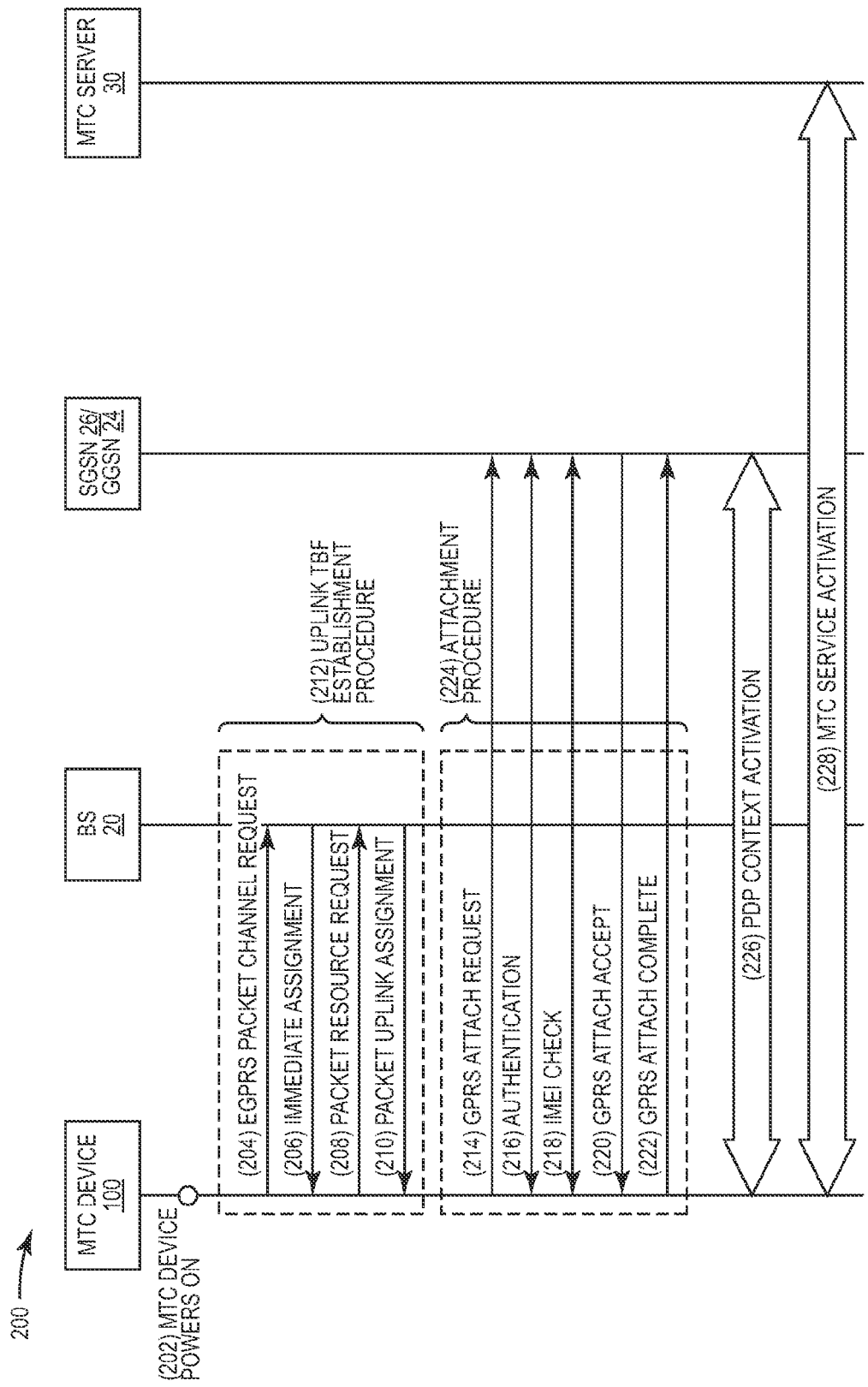
FIG. 2 illustrates an exemplary procedure for attachment of an MTC device and activation of an MTC service.

FIG. 2 illustrates an exemplary procedure 200 for attachment of the MTC device 100 and activation of an MTC service. The MTC device 100 powers on (step 202), and sends an Enhanced General Packet Radio Service (EGPRS) Packet Channel Request message on a contention-based RACH (step 204). Assuming any possible contention is won by the MTC device, 100, the base station 20 responds to the packet channel request by transmitting an Immediate Assignment message to the MTC device 100 (step 206). The MTC device 100 switches to a packet data channel (PDCH) and transmits a Packet Resource Request message describing the radio access capabilities and supported frequency band of the MTC device 100 (step 208).

The base station 20 responds to the Packet Resource Request message by sending the MTC device 100 a Packet Uplink Assignment message (step 210) indicating radio resources assigned on one or more PDCHs to be used by the MTC device 100. Steps 204-210 collectively define an uplink temporary block flow (TBF) establishment procedure 212 that allocates a TBF for the MTC device 100 to use for communicating with the base station 20.

Once the uplink TBF is established, the MTC device 100 switches to the assigned PDCH to transmit a GPRS Attach Request message via the determined uplink TBF to the SGSN 26 (step 214). In one example the GPRS Attach Request message has a "type of attach" field that indicates that the MTC device 100 is indeed an MTC device (and not a non-MTC wireless terminal, for example), and may further indicate the MTC device type of the MTC device 100.

Upon receipt of the GPRS Attach Request message (step 214), the SGSN 26 authenticates the MTC device 100 (step 216) and performs an IMEI check (step 218). The IMEI check (step 218) determines an International Mobile Equipment Identity of the MTC device 100.

The SGSN 26 then sends a GPRS Attach Accept message to the MTC device 100 (step 220), which triggers the establishment of a downlink TBF for the MTC device 100. The MTC device 100 uses the assigned uplink TBF (see uplink TBF establishment procedure 212) to transmit a GPRS Attach Complete message (step 222), which completes attachment of the MTC device 100 to the communication network 10. Steps 214-222 collectively define an attachment procedure 224.

After the attachment procedure 224, a PDP context activation procedure is performed (step 226). The PDP context is a data structure present on both the SGSN 26 and the GGSN 24 that contains PDP context information for the MTC device 100 when the MTC device 100 has an active PDP context. Step 226 may include a legacy PDP context activation procedure performed largely by the MTC device 100 (see, e.g., ch. 11 of 3GPP Technical Specification 34.123-1 "Protocol conformance specification" which deals specifically with PDP context activation). In some embodiments, the SGSN 26 may initiate the PDP context activation for the MTC device responsive to the Attach Request as described in U.S. Patent Application Ser. No. 61/326,495 or 61/332,932, for example.

After the PDP context activation (step 226), the MTC device 100 communicates with the MTC server 30 to become MTC service activated (step 228). That is, once the MTC device 100 is attached to the mobile communication network 10, the MTC service activation of step 228 activates the MTC device 100 with respect to the MTC server 30 and thereby allows the MTC device 100 to send and receive messages associated with the MTC applications it supports.

Figure 3:
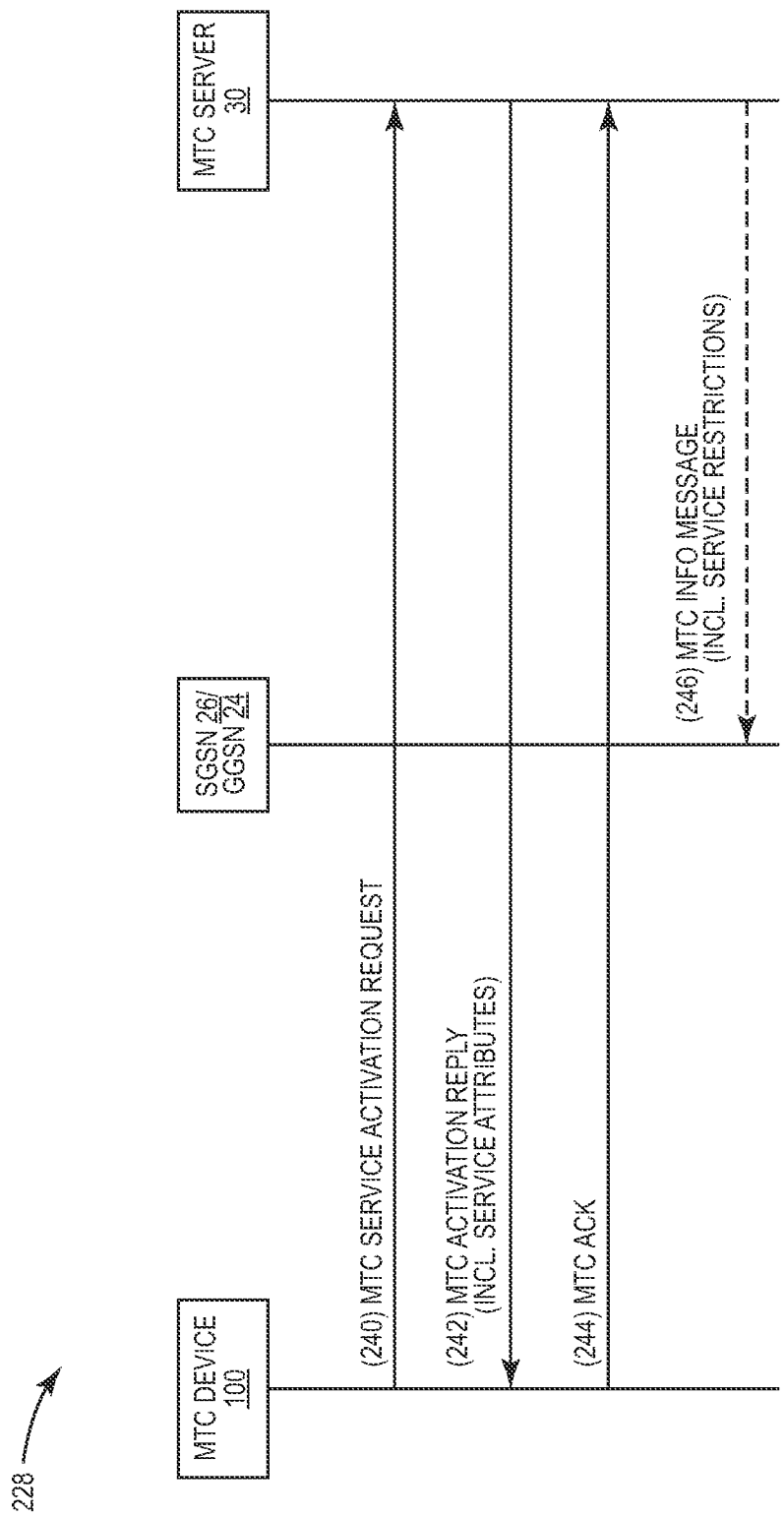
FIG. 3 illustrates an exemplary procedure for activating an MTC service.

FIG. 3 illustrates an exemplary procedure for the MTC service activation of step 228. The MTC device 100 sends an MTC activation request to the MTC server 30 (step 240). The MTC server 30 provides an MTC activation reply to the MTC device 100. The activation reply may include one or more service attributes for the MTC device 100 (step 242). The MTC device 100 transmits an acknowledgement to the MTC server 30 (244) to indicate successful receipt of the reply. Based on the acknowledgement, the MTC server 30 may also transmit an MTC informational message to the SGSN 26 or GGSN 24 that includes service restrictions applicable to the service attributes for the MTC device 100 (step 246). The SGSN 26 or GGSN 24 may use the service restrictions to implement attribute-specific service restrictions or convey operating parameters for any given MTC device 100, and to generally manage subsequent network access of the MTC device 100.

FIG. 4 illustrates an exemplary method 300 implemented by MTC device 100 of activating an MTC service with the MTC server 30. The MTC device 100 performs an MTC device attachment procedure to attach to the mobile communication network 10 (step 302). In one example step 302 corresponds to the portion of steps 224 of FIG. 2 that are performed by the MTC device 100.

After the MTC device 100 is attached to the mobile communication network 10, the MTC device 100 activates a PDP context for itself with the mobile communication network 10 (step 304). Step 304 may correspond to the PDP context activation step 226 of FIG. 2, for example. In one example, step 304 includes sending a "create PDP context" request from the MTC 100 device to the mobile communication network 10. In one example, step 306 includes sending an MTC service activation request to the MTC server 30 with a device type indicator (step 228 of FIG. 2), with the MTC activation request optionally including a default priority indication for the MTC device 100. The method 300 may also include the MTC device 100 receiving, during the MTC device activation, one or more service attributes for use in subsequent network access procedures (see, e.g., step 242 of FIG. 3). After the PDP context is established, the MTC device 100 activates an MTC service (step 306). Step 306 may correspond to step 228 of FIG. 2 or steps 240 to 246 of FIG. 3, for example.

FIG. 5 illustrates an exemplary method implemented by the MTC server 30 of managing network access of the MTC device 100. The MTC server 30 receives an MTC activation request from an MTC device 100 (step 402). The MTC server 30 transmits an MTC activation reply to the MTC device 100 based on the service request, with the activation reply including service attributes (step 404).

The MTC server then transmits service restrictions applicable to the service attributes to at least one of the SGSN 26 or GGSN 24 (step 406). The SGSN 26 or GGSN 24 may use the service restrictions to implement attribute-specific restrictions for any given MTC device 100 or convey operating parameters for any given MTC device 100, for example, or to generally manage subsequent network access of the MTC device 100.

Figure 6:
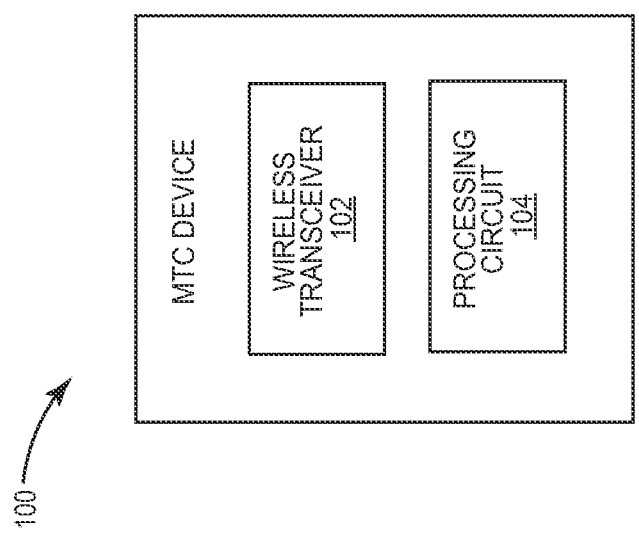
FIG. 6 illustrates an example MTC device.

FIG. 6 illustrates an example MTC device 100 that includes a wireless transceiver 102 for communicating with the base station 20 in the mobile communication network 10. The MTC device 100 also includes a processing circuit 104 configured to perform the method 300 and the steps of procedures 200 that are performed by the MTC device 100. Thus, the processing circuit 104 is configured to perform the following steps:

perform an MTC device attachment procedure to attach to the mobile communication network 10, after the MTC device 100 is attached to the mobile communication network 10, activate a PDP context for the MTC device 100 with the mobile communication network 10, and after the PDP context is activated, activate an MTC service with the MTC server 30.

Each of the components 102, 104 may be implemented in dedicated or otherwise fixed circuitry, or may be implemented in programmable digital processing circuitry, or in some combination of the two. For example, in at least one embodiment, the components 102, 104 comprise one or more computer-based circuits, such as one or more microprocessor-based circuits that are configured to operate as the wireless transceiver 102 and the processing circuit 104 based on the execution of computer program instructions stored in a memory or other computer-readable medium in or accessible to the MTC device 100. Other types of digital processing circuitry, such as FPGAs or ASICs, are also contemplated for use in implementing the components 102, 104.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented by a machine-type communication (MTC) device of activating an MTC service, said method comprising:

performing an MTC device attachment procedure to attach to a mobile communication network;

after the MTC device is attached to the mobile communication network, establishing a packet data protocol context for the MTC device with the mobile communication network;

after the packet data protocol context is activated, activating an MTC service with an MTC server, wherein said activating the MTC service with the MTC server comprises sending an MTC activation request to the MTC server with a device type indicator; and receiving, during the activating of the MTC service, one or more service attributes for use in subsequent network access procedures.

2. The method of claim 1 wherein performing an MTC device attachment procedure comprises sending, during the MTC device attachment procedure, an attach type indication to the network in an attach request message to indicate that an MTC device attachment is being performed.

3. The method of claim 1 wherein establishing a packet data protocol context for the MTC device with the mobile communication network comprises sending a create packet data protocol context request from the MTC device to the mobile communication network.

4. The method of claim 1 wherein the MTC activation request includes a default priority indication.

5. A machine-type communication device comprising:

a transceiver for communicating with a base station in a mobile communication network; and a processing circuit configured to:

perform an MTC device attachment procedure to attach to a mobile communication network;

after the MTC device is attached to the mobile communication network, establish a packet data protocol context for the MTC device with the mobile communication network;

after the packet data protocol context is activated, activate an MTC service with an MTC server, wherein to activate the MTC service with the MTC server, the processing circuit is configured to send an MTC service activation request to the MTC server with a device type indicator; and receiving, during activation of the MTC service, one or more service attributes for use in subsequent network access procedures.

6. The machine-type communication device of claim 5 wherein to attach to the mobile communication network, the processing circuit is configured to send, to the mobile communication network, an attach request message with an attach type indication to indicate that an MTC device attachment is being performed.

7. The machine-type communication device of claim 5 wherein to establish a packet data protocol context for the MTC device with the mobile communication network, the processing circuit is configured to send a create packet data protocol context request to the mobile communication network to activate the packet data protocol context.

8. The machine-type communication device of claim 5 wherein the processing circuit includes a default priority indication in the MTC activation request.

9. A method implemented by a machine-type communication (MTC) server of managing network access of an MTC device, said method comprising:

receiving an MTC activation request from an MTC device, the MTC activation request including a device type indicator;

transmitting an MTC activation reply including one or more service attributes to the MTC device based on the service request; and transmitting service restrictions applicable to the service attributes to at least one of a Serving GPRS Support Node (SGSN) or Gateway GPRS Support Node (GGSN) for management of subsequent network access of the MTC device.

* * * * *